(12) United States Patent
Yang et al.

(10) Patent No.: US 9,147,424 B2
(45) Date of Patent: Sep. 29, 2015

(54) APPARATUS AND METHOD FOR REPRODUCING AN OPTICAL RECORDING, AND COMPUTER-READABLE RECORDING MEDIUM

(71) Applicant: SAMSUNG ELECTRONICS CO., LTD., Suwon-si (KR)

(72) Inventors: Jong-ho Yang, Yongin-si (KR); Bong-gil Bak, Suwon-si (KR); Sung-ryeul Rhyu, Yongin-si (KR); Min-Seok Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/448,235

(22) Filed: Jul. 31, 2014

(65) Prior Publication Data

US 2015/0036471 A1 Feb. 5, 2015

(30) Foreign Application Priority Data

Jul. 31, 2013 (KR) .................. 10-2013-0091038

(51) Int. Cl.
*G11B 7/00* (2006.01)
*G11B 7/005* (2006.01)
*G11B 7/0037* (2006.01)
(Continued)

(52) U.S. Cl.
CPC ................ *G11B 7/005* (2013.01); *G06F 11/07* (2013.01); *G11B 7/00375* (2013.01); *G11B 20/1889* (2013.01)

(58) Field of Classification Search
CPC ................... G11B 20/1883; G11B 2220/2541; G11B 2020/1288; G11B 2020/1289; G11B 27/034; G11B 27/34; G11B 27/329; G11B 27/036
USPC ......... 369/47, 13, 53, 22, 53.13, 53.14, 53.15
See application file for complete search history.

(56) References Cited

U.S. PATENT DOCUMENTS 7,827,456 B2    11/2010   Zhang et al.
7,859,958 B2 *   12/2010   Takashima et al. ........ 369/47.13
8,107,789 B2    1/2012   Hashimoto et al.
(Continued)

FOREIGN PATENT DOCUMENTS

JP            4820754 B2    11/2011
KR   10-2006-0052256 A    5/2006
KR   10-2007-0007177 A    1/2007

OTHER PUBLICATIONS

Search Report dated Nov. 18, 2014 issued by the International Searching Authority in counterpart International Patent Application No. PCT/KR2014/006874 (PCT/ISA/210).

(Continued)

*Primary Examiner* — Nabil Hindi
(74) *Attorney, Agent, or Firm* — Sughrue Mion, PLLC (57) ABSTRACT

An optical recording reproducing apparatus, an optical recording reproducing method, and a computer-readable recording medium thereof, are provided. The optical recording reproducing apparatus is configured to operate an optical disc by using alternative reproducing files and includes an interface which accesses data recorded on the optical disc and reproducing-managing files used for reproducing the data, and an alternative reproducer which operates the optical disc by using the alternative reproducing files when accessing the reproducing-managing files cannot be performed.

14 Claims, 8 Drawing Sheets

| | 1ST REPRODUCING METHOD | ACCESS INFORMATION (Ex. Playlist 00000) |
|---|---|---|
| CONTENTS 1 <IMAGE, CONTENTS DESCRIPTION INFORMATION> | 2ND REPRODUCING METHOD | PREVIOUS ESTABLISHED INFORMATION BEFORE REPRODUCING (PREVIOUS ESTABLISHED INFORMATION FOR DECODER) |
| | | VIDEO ACCESS INFORMATION (FILE NAME, LBN, CHAPTER INFORMATION...) |
| | | AUDIO/SCRIPT ACCESS INFORMATION (FILE NAME, LBN, SELECT INFORMATION...) |
| | ⋮ | ... |
| | (n)TH REPRODUCING METHOD | ... |
| CONTENTS 2 <IMAGE, CONTENTS DESCRIPTION INFORMATION> | 1ST REPRODUCING METHOD | ... |
| | 2ND REPRODUCING METHOD | ... |
| | ⋮ | |
| CONTENTS N <IMAGE, CONTENTS DESCRIPTION INFORMATION> | ... | ... |

(51) Int. Cl.
*G06F 11/07* (2006.01)
*G11B 20/18* (2006.01)

(56) References Cited

U.S. PATENT DOCUMENTS

2003/0123859 A1 7/2003 Ikeda
2004/0258400 A1 12/2004 Yamaoka et al.
2005/0270949 A1 12/2005 Han et al.
2006/0092806 A1 5/2006 Ohno
2007/0166010 A1 7/2007 Van Gestel
2009/0263102 A1 10/2009 Shimada et al.

OTHER PUBLICATIONS

Written Opinion dated Nov. 18, 2014 issued by the International Searching Authority in counterpart International Patent Application No. PCT/KR2014/006874 (PCT/ISA/237).

* cited by examiner

| CONTENTS 1 <IMAGE, CONTENTS DESCRIPTION INFORMATION> | 1ST REPRODUCING METHOD | ACCESS INFORMATION (Ex. Playlist 00000) |
| --- | --- | --- |
| | 2ND REPRODUCING METHOD | PREVIOUS ESTABLISHED INFORMATION BEFORE REPRODUCING (PREVIOUS ESTABLISHED INFORMATION FOR DECODER) |
| | | VIDEO ACCESS INFORMATION (FILE NAME, LBN, CHAPTER INFORMATION…) |
| | | AUDIO/SCRIPT ACCESS INFORMATION (FILE NAME, LBN, SELECT INFORMATION…) |
| | | … |
| | ⋮ | |
| | (n)TH REPRODUCING METHOD | … |
| CONTENTS 2 <IMAGE, CONTENTS DESCRIPTION INFORMATION> | 1ST REPRODUCING METHOD | … |
| | 2ND REPRODUCING METHOD | … |
| ⋮ | | |
| CONTENTS N <IMAGE, CONTENTS DESCRIPTION INFORMATION> | … | … |

FIG. 8

APPARATUS AND METHOD FOR REPRODUCING AN OPTICAL RECORDING, AND COMPUTER-READABLE RECORDING MEDIUM

CROSS-REFERENCE TO RELATED APPLICATIONS

This application claims priority from Korean Patent Application No. 10-2013-0091038, filed on Jul. 31, 2013 in the Korean Intellectual Property Office, the disclosure of which is incorporated herein by reference, in its entirety.

BACKGROUND

1. Technical Field

Devices, methods and medium consistent with what is disclosed herein relate to an apparatus and a method for reproducing optical recording, and a computer-readable recording medium. More specifically, exemplary embodiments relate to an optical recording reproducing apparatus configured to reproduce contents by using alternative reproducing files when java applications cannot be normally loaded and activated due to defects on a Blu-ray optical Disc™, an optical recording reproducing method, and a computer-readable recording medium.

2. Description of the Related Art

High density optical disc Blu-ray Disc™ (BD) may be divided into high density movie Blu-ray Disc™ which is widely used, and Java Blu-ray disc (BD-J) which is recently commercialized. An optical disc device such as Blu-ray disc player (BD-Player) provided with a function of reproducing BD-J implements Java virtual machine (JVM®).

Such JVM® is a term which indicates an applied program used by Sun Micro Systems who is a developer of Java language and its implementing environment. That is, an applied program that performs an interface role between complied Java binary codes and a microprocessor implementing program commands or hardware platforms.

Further, unique disc type information indicates that the optical disc type is BD-J is recorded on lead-in area of BD-J. In addition, Java archive (JAR) file is recorded on an initiative section of data area.

A JAR file is Zip file which includes Java application files and various materials that Java applications will use. The optical disc device performs implementing a plurality of Java applications that run JVM®.

Further, in response to completing implementation of a Java applications, the optical disc device generates menu images of various user interfaces supported from Java applications, displays outputting through a TV, and performs a voluntary process requested by a user; for example, a series of reproducing functions that read and reproduce audio and video data recorded on BD-J.

However, in response to a user reproducing a read-only optical disc such as conventional BD and DVD-ROM, and when physical defects occur on the surface of the disc, the user may experience a problem that contents cannot be reproduced because normal loading of applications recorded on the optical disc is not possible due to process errors.

Therefore, a user having a defective optical disc should buy the same disc again, which incurs additional cost. Further, even if compensation is provided, the process may be difficult to perform. Thus, a user may experience a lot of inconvenience.

SUMMARY

Exemplary embodiments overcome the above disadvantages and other disadvantages not described above. Also, the exemplary embodiments are not required to overcome the disadvantages described above, and an exemplary embodiment may not overcome any of the problems described above.

According to an exemplary embodiment, a technical objective is to provide an optical recording reproducing apparatus which is configured to reproduce contents by using alternative reproducing files when normal loading and activating of Java applications are not possible due to defects on a Blu-ray optical Disc™, an optical recording reproducing method, and computer-readable recording medium thereof.

According to an exemplary embodiment, an optical recording reproducing apparatus is provided to operate an optical disc by using alternative reproducing files stored on the optical disc, in which the optical recording reproducing apparatus may include an interface configured to access data recorded on the optical disc and reproducing-managing files used for reproducing the data, and an alternative reproducer configured to operate the optical disc by using the alternative reproducing files, when accessing the reproducing-managing files stored on the optical disc cannot be performed.

The alternative reproducer may include an alternative-reproducing determiner configured to determine whether or not accessing the reproducing-managing files can be performed, and a controller configured to implement the alternative reproducing files when accessing is determined to not be performed.

The alternative reproducing files may be registered in a file name on a file system which is one of the reproducing-managing files.

The alternative-reproducing determiner may additionally determine whether or not implementing the alternative reproducing files registered on the file system can be performed, and may search the alternative reproducing files registered on an arbitrary area of the optical disc by reading information related to the alternative reproducing files defined on a previously established area of the optical disc, when implementing the alternative reproducing files cannot be performed according to the determining result of the alternative-reproducing determiner.

The information related to the alternative reproducing files may include a start address, end address or length information regarding the alternative reproducing files.

The optical recording reproducing apparatus may additionally include a menu generator configured to generate a menu screen in order to form an interface with a user so that the data selected by the user can be reproduced. The menu generator may operate, when implementing index files which are one of the reproducing-managing files, cannot be performed.

The alternative reproducer may determine that accessing the reproducing-managing files cannot be performed, when the reproducing-managing files are not available.

In one exemplary embodiment, an optical recording reproducing method is provided, which may include determining whether driving an optical disc in which alternative reproducing files are stored can be performed, and reproducing the data by implementing alternative reproducing files registered on reproducing-managing files which are used to reproduce data recorded on the optical disc.

The alternative managing files may be registered in a file name on a file system which is one of the reproducing-managing files.

The reproducing the data may include determining whether implementing the alternative reproducing files registered on the reproducing-managing files can be performed, and reading information related to the alternative reproducing files defined on a previously established area of the optical disc, searching the alternative reproducing files recorded on an arbitrary area of the optical disc, and reproducing the data when implementing the alternative reproducing files cannot be performed.

The information related to the alternative reproducing files may include a start address, end address or length information regarding the alternative reproducing files.

The optical recording reproducing method may additionally include generating and displaying a menu screen to form an interface with a user so that the data selected by the user can be reproduced. The generating and displaying the menu screen may generate and display the menu screen, when implementing index files, which are one of the reproducing-managing files, cannot be performed.

In one exemplary embodiment, a computer-readable recording medium is provided to implement an optical recording-reproducing method, in which the optical recording reproducing method may include determining whether driving an optical disc in which alternative reproducing files are stored can be performed, and reproducing the data by implementing alternative reproducing files registered on reproducing-managing files which are used to reproduce data recorded on the optical disc when driving the optical disc cannot be performed according to the determining result of the alternative-reproducing determiner.

An aspect of an exemplary embodiment may provide a method of reproducing an optical recording, the method including: determining whether reproducing a title which represents a playlist is successful; in response to reproducing a title representing the playlist not being successful, implementing a first alternative reproducing file related to the title representing the playlist; and reproducing the alternative reproducing file related to the title representing the playlist.

The optical recording reproducing method may further include the step of positioning the alternative reproducing file in an arbitrary area of an optical disc.

Information related to the alternative reproducing file may include a start address, end address or length information regarding the alternative reproducing file.

BRIEF DESCRIPTION OF THE DRAWINGS

The above and/or other aspects will be more apparent by describing certain exemplary embodiments with reference to the accompanying drawings, in which.

DETAILED DESCRIPTION OF THE EXEMPLARY EMBODIMENTS

Certain exemplary embodiments will now be described in greater detail with reference to the accompanying drawings.

In the following description, same drawing reference numerals are used for the same elements even in different drawings. The matters defined in the description, such as detailed construction and elements, are provided to assist in a comprehensive understanding of the exemplary embodiments. Accordingly, it is apparent that the exemplary embodiments can be carried out without those specifically defined matters. Also, well-known functions or constructions are not described in detail since they would obscure the invention with unnecessary detail.

Figure 1:
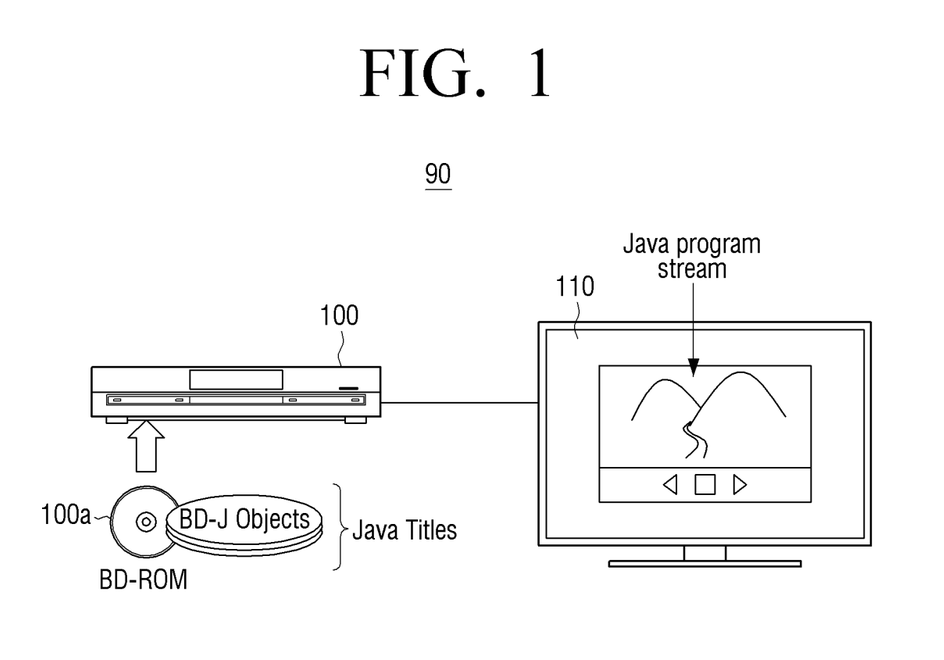
FIG. 1 is a diagram which describes an optical recording reproducing system according to an exemplary embodiment.
Figure 2:
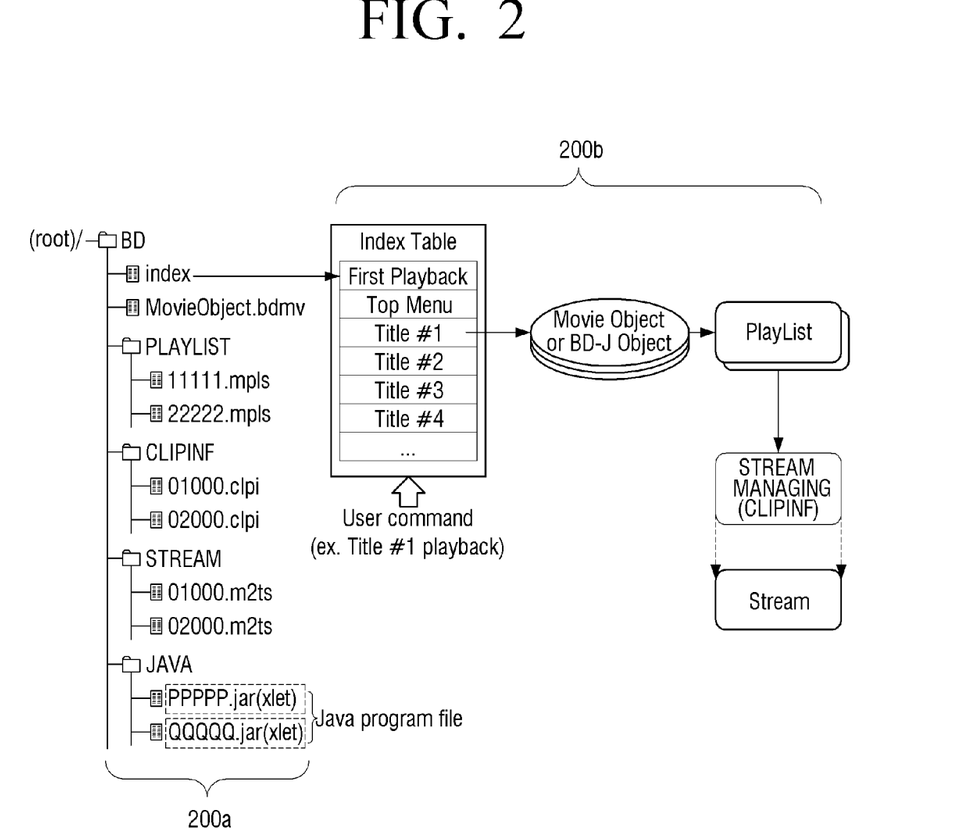
FIG. 2 is a diagram which describes a file structure recorded within the BD-ROM of FIG. 1, and the relation between files within each file structure in response to a specific title being reproduced from the file structure.
Figure 3:
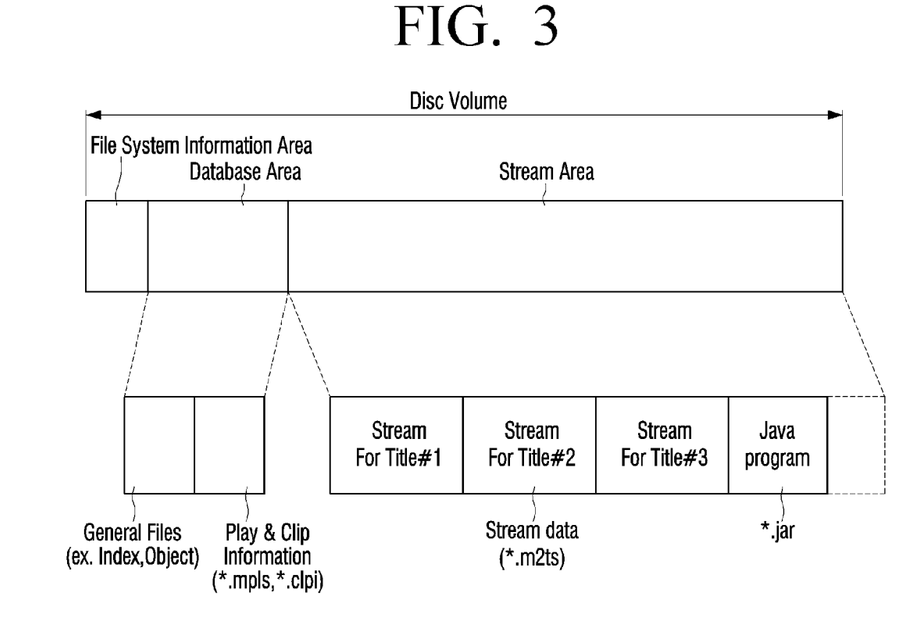
FIG. 3 is a diagram which describes a format of recording information related to the file structure of FIG. 2 within the BD-ROM.

FIG. 1 is a diagram which describes an optical recording reproducing system according to an exemplary embodiment, FIG. 2 is a diagram which describes a file structure recorded within the BD-ROM and the relationship between files in each file structure in response to a specific title being reproduced from the file structure, and FIG. 3 is a diagram which describes a format of recording information related to the file structure of FIG. 2 within the BD-ROM.

Referring to FIG. 1, the optical recording reproducing system 90 according to an exemplary embodiment is one example of when all the titles recorded on an optical disc, i.e., BD-ROM 100a (referred to a disc in the following description) are Java titles, and includes an optical recording-reproducing apparatus 100 and an image display apparatus 110.

Beside reproducing the disc 100a, the optical recording-reproducing apparatus 100 reads data within the disc 100a, signal-processes and decodes the read data according to the features, and outputs corresponding data to the image display apparatus 110 so that a user can view contents such as a movie through the screen of the image display apparatus 110.

In response to the disc 100a operating normally, the optical recording-reproducing apparatus 100 may perform functions according to the file structure 2100a illustrated in FIG. 2. Referring to the file structure 2100a, at least one of the BD directories are created under one root directory, normal files to guarantee interworking with a user, i.e., index file ("index") and object file ("MovieObject.bdmv") as upper file information are provided within the BD directory, playlist directory (PLAYLIST), clip info directory (CLIPINF) and stream directory (STREAM) are provided as directories having information regarding recorded data on the disc and information regarding a method of reproducing the data. Further, a JAVA directory constituted with Java program files is provided therein.

Herein, the stream directory (STREAM) provides AV stream files recorded in a specific format within the disc, for example, "*.m2ts" is used as extension name of the stream file (01000.m2ts, 02000.m2ts). In the stream files, video data is normally recorded.

The clip info directory (CLIPINF) is constituted with clip info files (01000.clpi, 02000.clpi) which respectively correspond to the stream files. Specifically, in the clip info files (*.clpi), feature information and timing information of corresponding stream files are recorded. Further, the BD standard names a bundle of the stream files (*.m2ts) and respectively corresponding clip info files (*.clpi) as "clip." Thus, one stream file (*.m2ts) should provide a corresponding clip info file (*.clpi).

The playlist directory (PLAYLIST) is constituted with playlist files (*.mpls). Each playlist file (*.mpls) includes at least one play item which designates a playing interval which is a time of reproducing a specific clip, and the play items provide information regarding reproducing a start time (IN-Time) and reproducing end time (OUT-Time) of the clips designated as clip name (clip_Information_File_name) within the play items.

Thus, the playlist file (*.mpls) is a basic reproducing-managing file unit within a whole reproducing-managing file structure which performs reproduction of a requested clip by combining at least one play item. Further, the playlist file (*.mpls) may provide sub play items (SubPlayItem) to reproduce different data from the data reproduced by the play items, i.e., additional data.

Further, the playlist file (*.mpls) operates only with a command or a program of the above described object. Thus, in view of disc reproducing scenario, the object performs a dynamic scenario and the playlist file (*.mpls) performs a static scenario.

In the Java directory, Java program files (e.g., PPPPP.jar or QQQQQ.jar) are recorded, and various applications are programmed in each of the Java program files, which is called as "Xlet". For the relevant explanation, a Java program file (*.jar) provides a "BDJ Object" to perform Java titles. In response to a user trying to reproduce a specific Java title, one Java program file including "BDJ Object" is implemented. The Java program file may be processed by the designated reproducing means.

Element 200b illustrates a relationship in which a specific title is reproduced by the file structure 200a. The following will explain the relationship in which corresponding title is reproduced in response to there being a title reproducing command of a user regarding a specific title provided by the index table of the index files.

The index file is constituted with "First Playback" information having information regarding a screen which is first reproduced in response to a corresponding disc 100a being loaded, "Top_Menu" information providing menu screen, and at least one "titles (e.g., Title #1~Title #4)" information. The titles (Title #1~Title #4) may be Java titles desirably; however, they may be HDMV titles.

In response to a user selecting a reproducing specific title (e.g., Title #1), specific play list is reproduced according to a specific object command linked with the title (Title #1) within the object file of the file structure 200a, and a specific clip, which is constituted with "*.clpi" and "*.m2ts", is reproduced by the play item within the playlist.

In cases where the selected title (Title #1) is a HDMV title, it is reproduced by specific "Movie Object" within one object file. In response to the selected title (Title #1) being a Java title, a specific "BDJ Object" within the Java program file (*.jar) of Java directory is used.

Further, the index file may be "index.bdj", which may be constituted in a format that both of HDMV title and Java title can be indexed. In addition, two index files may be constituted by including "index.bdmv" which only indexes a HDMV title for the optical recording-reproducing apparatus 100 that can only reproduce an HDMV title.

FIG. 3 briefly illustrates a format in which information related to the file structure 200a is recorded within the disc 100a. From the inner circle of the disc 100a, a file system information area as system information to manage whole files, area in which the playlist files and the clip info files to reproduce the recorded stream (*.m2ts) are recorded, which is called as "database area," and stream area in which streams constituted with audio/video/graphics are recorded. Herein, the file system of the file system information area may be stored as being copied, i.e., in a backup file format, on a plurality of areas of the disc 100a.

The optical recording reproducing apparatus 100, according to an exemplary embodiment, may implement relevant applications in order to reproduce Java titles. The application standard of the disc 100a uses a title as basic unit of constituting and reproducing applications. In response to a user inserting the disc 100a, on which image contents are recorded into the optical recording reproducing apparatus 100, the optical recording reproducing apparatus 100 selects a title to be initially reproduced by processing information files (or reproducing-managing files) within the disc 100a, e.g., the file system, and performs an activation process by loading the application for a corresponding title. Herein, a title may be understood as menu information which is displayed on the screen of the image display apparatus 110 in response to a user initially reproducing the disc 100a.

The activated application may display contents such as image/sound/script designated by a contents manufacturer to a user by communicating with middleware provided on the optical recording reproducing apparatus 100, i.e., specific software, and may reproduce the contents selected by a user. Thus, a main operation related to reproducing contents is performed by the application provided on the disc 100a. The method of using the application provides various selection opportunities and provides user convenience for a user through the provided application of the disc 100a, as well as simply providing contents.

However, in response to application data or data necessary for user convenience on the disc 100a being defective due to physical fault of the disc 100a, such as a scratch, the application cannot operate normally. This problem may happen in response to other information files being defective. Therefore, a DVD that only supports the reproducing method with the application cannot normally operate in reproducing contents of the disc 100a which is manufactured according to the Blu-ray application standard. It may even occur that the video stream files finally reproduced through interworking between the application and a user are not available for reproducing when there is no physical fault. In response to a video contents file having physical errors due to a scratch on the disc 100a, outputting data cannot be normally performed on the screen for a while because decoding the video contents file cannot be normally performed due to data errors when a part related to the errors is reproduced; however, after passing a corresponding section, normal reproducing may be performed again.

In response to reproducing contents through the application failing permanently, the optical recording-reproducing apparatus 100 according to an exemplary embodiment may perform an alternative reproducing process through interworking with a user. For example, the optical recording-reproducing apparatus 100 may request whether a user wants to reproduce contents with alternative reproducing files when the reproducing process fails. However, the alternative reproducing files may be implemented without the above process. Herein, alternative reproducing refers to reproducing by the alternative method to solve the problem when a user cannot view contents provided on the disc 100a due to errors in some data. For the alternative reproducing, the disc 100a according to an exemplary embodiment may include the alternative reproducing files, and the optical recording-reproducing apparatus 100 may obtain the alternative reproducing files within the disc 100a on a designated position according to the disc standard when reproducing contents fails.

The optical recording-reproducing apparatus 100 may use two methods in order to obtain the alternative reproducing files. In other words, in response to the files being expressed in a file name format on the file system, the optical recording-reproducing apparatus 100 may search and implement the alternative reproducing file on the designated location of the registered name on the file system. In cases, in response to faults occurring on the alternative reproducing files placed on the corresponding position, the optical recording-reproducing apparatus 100 may implement the alternative reproducing file on specific area of the disc 100a through addresses of the alternative reproducing files (or information related to the alternative reproducing files). A start address, end address or length information may be indicated on a previously established area of the disc 100a, e.g., a specific position as a hidden area. Herein, a hidden area may indicate resting area of the disc 100a. Further, in order to find addresses of the alternative reproducing files, a system builder may previously establish address information on middleware of the optical recording-reproducing apparatus 100, i.e., on software. In other words, in response to a determination that implementing the alternative reproducing file on a designated position registered on the file system cannot be performed, the optical recording-reproducing apparatus 100 is established to search a specific area on the disc 100a, according to the previously established address information.

As described above, the alternative reproducing files indicate the method of accessing corresponding contents without performing requested processes for loading and processing applications. Thus, in response to a contents manufacturer of the disc 100a providing the alternative reproducing files on the disc 100a so that contents can be reproduced without loading the applications in preparation for a difficult situation with respect to normal contents accessing and reproducing through the applications, middleware of the optical recording-reproducing apparatus 100 may provide a list of the files that can be reproduced to a user based on the alternative reproducing files, and a user can view contents through the files.

Figure 4:
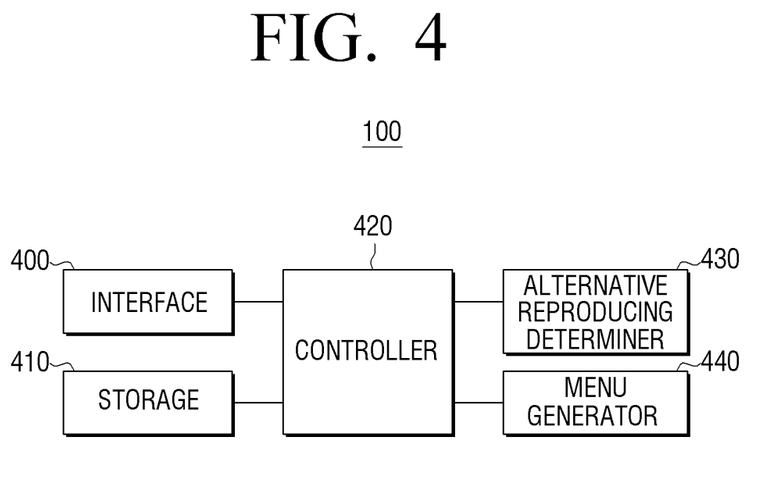
FIG. 4 is a block diagram which describes a constitution of the optical recording-reproducing system of FIG. 1.

FIG. 4 is a block diagram which describes a structure of the optical recording-reproducing apparatus of FIG. 1.

Referring to FIG. 4 with FIG. 1, the optical recording-reproducing apparatus 100, according to an exemplary embodiment, includes all or parts of an interface 400, a storage 410, a controller 420, an alternative-reproducing determiner 430, and a menu generator 440.

Herein, including all or parts of an interface 400 refers to the controller 420 and the alternative-reproducing determiner 430 being united to constitute an alternative reproducer, some part such as the menu generator 440 is deleted, or some part is united and constituted in the other part. For a clear understanding, including all will be explained in the following.

The interface 400 may include a user interface and a communication interface. The user interface may include a button to interface with a user, or may include a display in order to display the processed information. The communication interface may additionally perform a process such as information converting in order to load the data recorded on the disc 100a and transmit the recorded data to the image display apparatus 110. The communication interface may read, store and manage file information of the reproducing-managing files recorded on the disc 100a which are used to reproduce the data in order to load the data. Herein, the communication interface may preferably include a recording reproducer, i.e., a pick-up, a servo, a signal processor, a memory, and a microcomputer which are conventionally included in a reproducing apparatus.

Further, in response to it being impossible to reproduce the index files related to menu information displayed on the screen of the image display apparatus 110 in order to reproduce the selected data by a user, the interface 400 downloads programs or applications related to the menu information through communication with an external device. Also, downloading may be performed under the control of controller 420. Herein, the index files are one of the reproducing-managing files. In other words, the index files are provided in an interface window format so that a user can select one content from among a plurality of contents, through the menu screen. The index files may manage the providing of various visual information, e.g., implementing Java applications.

The storage 410 may store information processed through the interface 400. For example, the storage 410 may store file information of the reproducing-managing files and data related to the contents that are loaded on the disc 100a. Such loaded file information and data may be activated and processed under the control of controller 420.

The controller 420 controls general operation of the optical recording-reproducing apparatus 100. For example, in response to a determination that the file information cannot be read due to physical faults of the disc 100a, the controller 420 may control the interface 400 to implement the alternative reproducing file on a designated position registered on the file system within the disc 100a. Further, in response to a determination that the alternative reproducing files cannot be implemented due to failure of reading the file system, the controller 420 may control the interface 400 to read the alternative reproducing file recorded on a specific area of the disc 100a, according to the previously established information. Herein, the previously established information may be indicated on a hidden area of the disc 100a, i.e., a resting area of the disc 100a according to the standard of the disc 100a; however, the previously established information may be used by storing relevant information on the storage 410 with a system builder. In response to the previously established information being indicated according to the standard, relevant information may be defined within programs related to alternative reproducing, e.g., within middleware. In this case, a corresponding operation may be performed through implementing the middleware.

Further, in response to a determination that the menu information cannot be displayed on the screen of the image display apparatus 110 because it is impossible to implement the index files within the disc 100a which are related to visual information from among the reproducing-managing files, the controller 420 may control displaying the menu information in an interface window format on the screen of the image display apparatus 110 by implementing the applications separately stored on the menu generator 440. During this process, the applications may be Java applications to maximize visual effects.

The alternative-reproducing determiner 430 may determine whether the alternative reproducing files within the disc 100a are implemented in response to a confirmation that there is no read file information for a certain period of time after the interface 400 accesses the disc 100a. In response to implementing the alternative reproducing files being determined to be necessary, the alternative-reproducing determiner 430 may inform controller 420 of the determining result. Further, the alternative-reproducing determiner 430 determines whether it is impossible to implement the alternative reproducing files. The alternative reproducing files may be also defective due to physical faults. Thus, the alternative-reproducing determiner 430 may determine that the alternative reproducing files are not implemented for a certain period of time. In this case, the alternative-reproducing determiner 430 may read the alternative reproducing file registered on specific area of the disc 100a by obtaining information separately stored on the storage 410, or may address information related to the alternative reproducing files through middleware, which is internally stored software. Further, the alternative reproducing files recorded on specific area may be read through address information of the alternative reproducing files recorded on a resting area of the disc 100a, i.e., a start address, end address or length information. In addition, various methods may be applied. The above exemplary embodiment may not limit the reading method.

The menu generator 440 may include applications to form the interface with a user in order to reproduce the contents selected by a user. Normally, the menu information should be displayed on the screen of the image display apparatus 110 by implementing the index files within the disc 100a. However, when the index files cannot be implemented, the controller 420 may support operation of a following process by implementing the applications of the menu generator 440.

Figure 5:
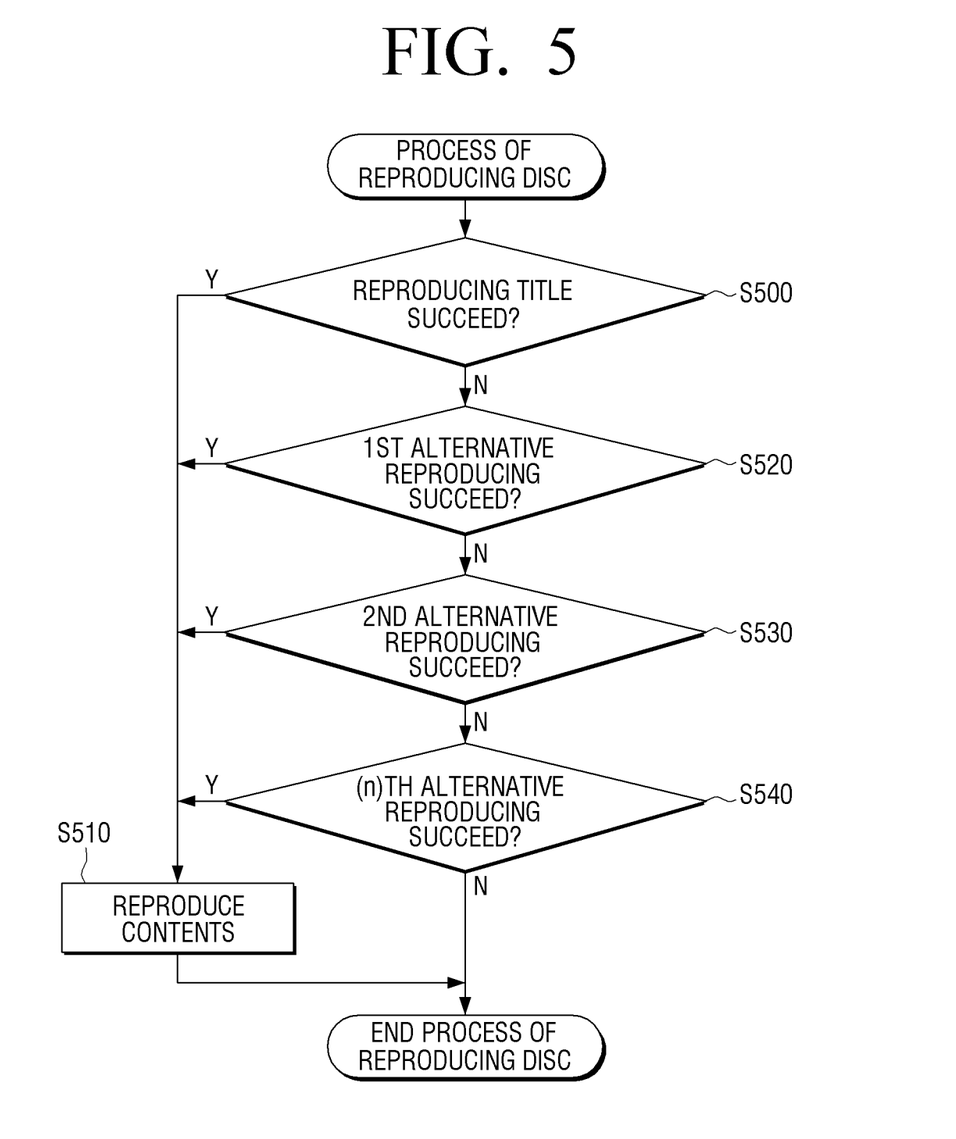
FIG. 5 is a flowchart which describes a process of reproducing an optical recording according to a first exemplary embodiment.
Figure 6:
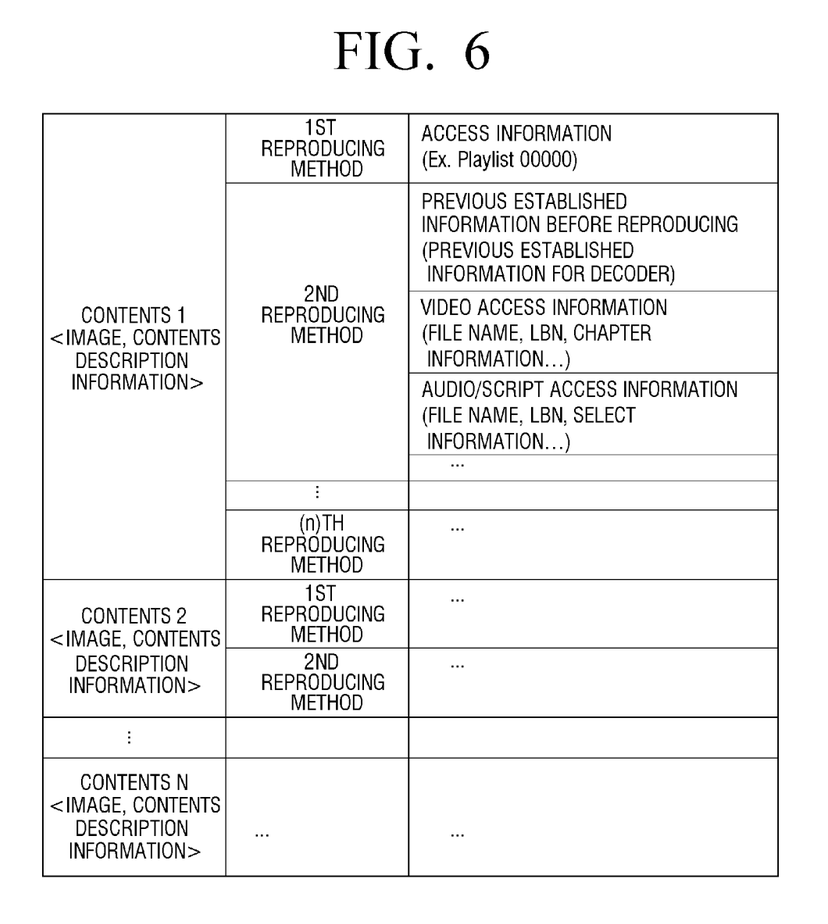
FIG. 6 is a diagram which illustrates a structure regarding an alternative reproducing file according to an exemplary embodiment.

FIG. 5 is a flowchart which describes a process of reproducing an optical recording according to a first exemplary embodiment, and FIG. 6 is a diagram which illustrates a structure of the alternative reproducing file, according to an exemplary embodiment.

For convenience of explanation, referring to FIG. 5 with FIG. 1, the optical recording-reproducing apparatus 100 according to an exemplary embodiment may read file information of the reproducing-managing files, such as index files, through the file system as defined in the standard in response to the disc 100a being loaded on the pickup.

During the above process, the optical recording-reproducing apparatus 100 may determine whether or not reproducing the titles which indicate the playlists of the contents is successful after the index files are implemented first at S500.

When reproducing the titles is successful and no problem occurs after the reproducing, the optical recording-reproducing apparatus 100 may normally reproduce the selected contents by a user at S510.

However, when reproducing the titles fails, the optical recording-reproducing apparatus 100 performs a process of implementing a first alternative reproducing related to the playlists, by implementing the alternative reproducing files at S520. Thus, the alternative reproducing information related to the playlists is processed.

After reproducing the titles, the optical recording-reproducing apparatus 100 may determine whether or not the consecutive reproducing-managing files are implemented. In response to the consecutive reproducing-managing files not being implemented, the optical recording-reproducing apparatus 100 may implement the second to N alternative reproducing processes at S530, S540, and process information corresponding to the alternative reproducing process of a corresponding class, which reproducing the contents. In practice, until the selected contents by a user is reproduced, the first to N alternative reproducing processes constituted with a plurality of classes may be performed; and reproducing the contents may be performed through one method of these processes.

Referring to FIG. 6, in response to contents 1 to contents N being information confirmed on the playlists, the first to N reproducing processes reproduce the contents by processing the alternative reproducing information of the class in response to the reproducing-managing files not being implemented. The alternative reproducing processes according to an exemplary embodiment may be varied according to defective positions or a defective extent of the disc 100a.

The alternative reproducing files of FIG. 6 are files which include information that can perform reproducing through the middleware even when operation of the application is not possible. The alternative reproducing files describe a method of accessing a plurality of contents within the files, i.e., N number of contents.

The alternative reproducing files according to an exemplary embodiment may be divided into contents representative description information and contents reproducing detailed information. The contents representative description information is explained first. The alternative reproducing files include information to generate a user selection screen regarding each contents, and representative images of the contents and contents description information constituted with texts are provided, as illustrated in FIG. 6. Further, contents representative description information may provide video/audio position information for explaining the contents. The optical recording-reproducing apparatus 100 creates and displays a screen to a user for user selection by using the described contents representative images, video, audio and text.

Further, regarding the contents reproducing detailed information, a plurality of the reproducing methods (N number of the reproducing methods) are described regarding each content, as described above. Regarding the standard of Blu-ray optical Disc™ applications and operations necessary for reproducing can only be described by selecting the playlists. The playlists are representative structure to describe detailed information such as audio, video, subtitle, menu and blocking section internally requested for the reproducing. Such most upper structure for the reproducing may be selected with the first reproducing method. However, in preparation for the case in which normal accessing of the playlists cannot be performed due to faults of the disc 100a, the second reproducing method may be described. In the example of FIG. 6, the second reproducing method describes decoding established information prior to reproducing, and video/audio/script in a separate stream accessing information. Further, detailed information necessary for the reproducing may be included by the intention of a contents manufacturer. FIG. 6 is merely one exemplary embodiment; constituting the first to N reproducing processes may be freely formed by a contents manufacturer. Thus, the first reproducing method may also describe the method of accessing the detailed information, not the playlists.

The optical recording-reproducing apparatus 100 may try reproducing through a next method in response to the first method failing and the second method is tried, but fails. The detailed description according to an exemplary embodiment may be performed by describing accessing information regarding the files necessary for the reproducing on the optical disc application standard, and describing information necessary for the file system and the decoder, such as logical block number. The contents that can be reproduced may also describe the files provided on the optical disc and the network and their accessing information.

Figure 7:
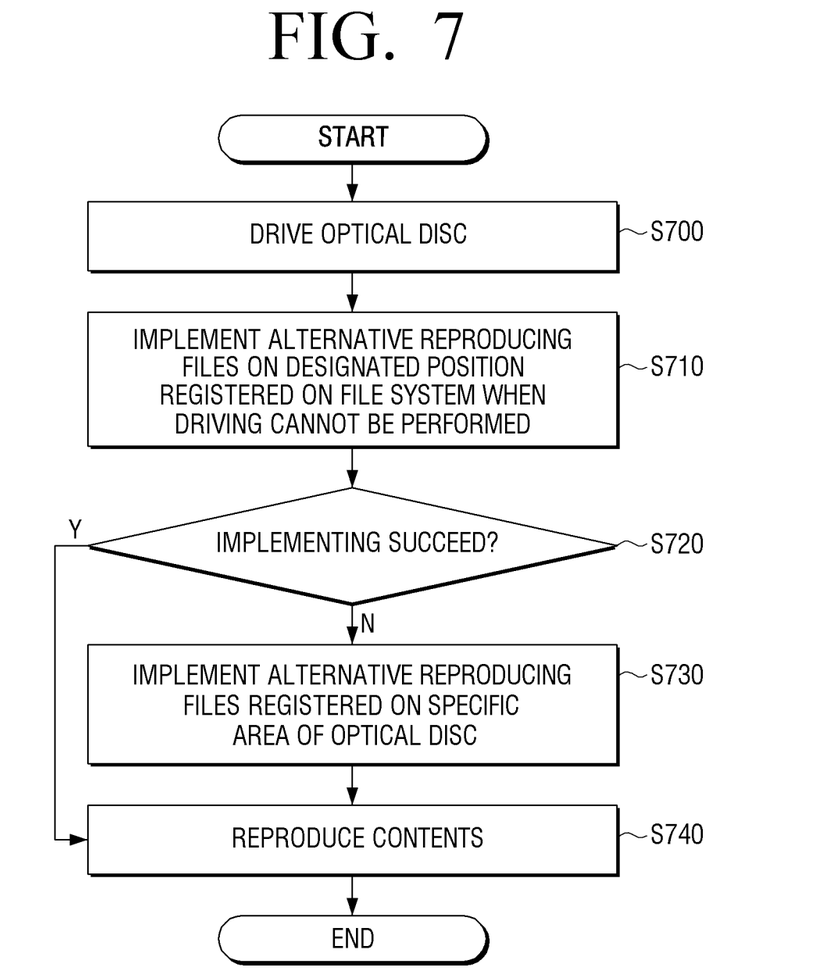
FIG. 7 is a flowchart describing a process of reproducing an optical recording according to a second exemplary embodiment.
Figure 8:
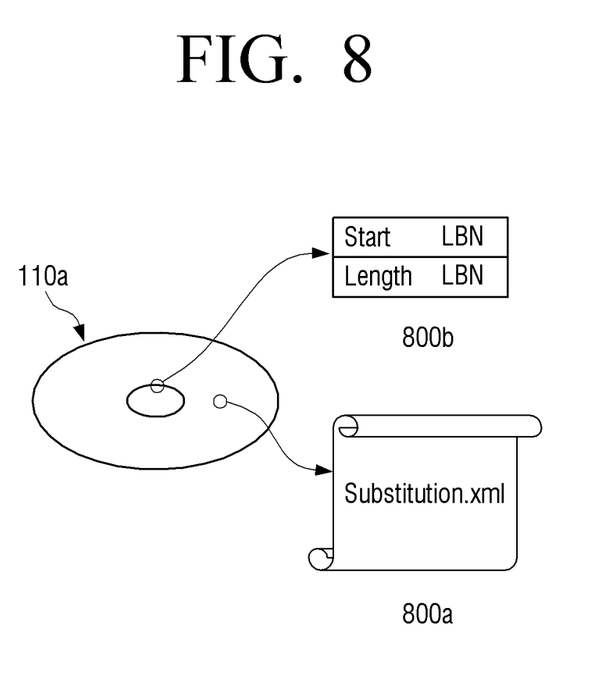
FIG. 8 is a diagram which explains a method of obtaining alternative reproducing files according to an exemplary embodiment.

FIG. 7 is a flowchart which describes an optical recording-reproducing process according to a second exemplary embodiment, and FIG. 8 is a diagram which describes a method of obtaining the alternative reproducing files according to an exemplary embodiment. FIGS. 7 and 8 illustrate detailed operations even when the alternative reproducing files are defective during the process of FIG. 5.

For convenient explanation, referring to FIG. 7 with FIG. 1, the optical recording-reproducing apparatus 100 according to an exemplary embodiment may perform a process of driving the disc 100a loaded on the pick up and reproducing the selected contents by a user, at S700.

During the above process, the optical recording-reproducing apparatus 100 implements the alternative reproducing file on a designated position registered on the file system through the first to the N alternative reproducing processes illustrated in FIG. 5, in response to a determination that driving the disc 100a cannot be performed at S710. Element 800a of FIG. 8 illustrates the alternative reproducing files registered in a file name on the file system.

When implementation is successful through the alternative reproducing files registered on the file system at S720, the optical recording-reproducing apparatus 100 may reproduce the selected contents by a user at S740 in response to no problem occurring thereafter.

However, in response to implementation failing, the optical recording-reproducing apparatus 100 reads the alternative reproducing files registered on specific area of the disc 100a and reproduces the contents with information related to the alternative reproducing files, as illustrated by element 800b and steps S730, S740. Herein, the information related to the alternative reproducing files may include start information, end information or length information of the alternative reproducing files registered on hidden area of the disc 100a, i.e., a resting area. This is already described in detail in the foregoing, which will not be further described.

Meanwhile, although the above describes that all the units constituting an exemplary embodiment are united into one device and the combined one device operates, the invention is not limited thereto. Within the scope of the exemplary embodiments, all the units may be selectively combined and operate with at least one unit. Further, all of the units may be implemented one by one to be independent hardware; however, parts or a whole of the units may be selectively combined and implemented to be a computer program including program modules which perform the functions of the parts or the whole combined in one or a plurality of hardware. Codes and code segments constituting the computer program can be easily understood by a person of ordinary skill in the art. Such computer program may be stored in non-transitory computer-readable recording medium which can be read by a computer, read and implemented by a computer, which implementing the exemplary embodiments.

Non-transitory computer-readable recording medium indicate medium which store data semi-permanently and can be read by devices, not medium storing data temporarily such as register, cache, or memory. Specifically, the above various applications or programs may be stored and provided in non-transitory computer-readable recording medium such as CD, DVD, hard disk, Blu-ray Disc™, USB, memory card, or ROM.

Further, the foregoing exemplary embodiments and advantages are merely exemplary and are not to be construed as limiting. The present teachings can be readily applied to other types of apparatuses. In addition, the description of the exemplary embodiments is intended to be illustrative, and not to limit the scope of the claims.

What is claimed is:

1. An optical recording-reproducing apparatus configured to read an optical disc, the optical recording-reproducing apparatus comprising:
   an interface configured to read data recorded on the optical disc; and
   a reproducer configured to attempt to reproduce target video data recorded on the optical disc by executing a reproducing-managing file used for accessing the target video data, and attempt to reproduce the target video from the optical disc by executing an alternative reproducing file that includes information to access the target video data in response to a failure of reproducing the target video by using the reproducing-managing file.

2. The optical recording-reproducing apparatus of claim 1, wherein the reproducer comprises:
   an alternative-reproducing determiner configured to determine whether or not accessing the reproducing-managing file can be performed; and
   a controller configured to implement the alternative reproducing files when accessing the reproducing-managing file is determined not to be performed.

3. The optical recording-reproducing apparatus of claim 2, wherein the alternative reproducing file is registered in a file name on a file system including the reproducing-managing file.

4. The optical recording-reproducing apparatus of claim 3, wherein the alternative-reproducing determiner additionally determines whether or not implementing the alternative reproducing file registered on the file system can be performed, and
   searches the alternative reproducing file registered on an arbitrary area of the optical disc by reading information related to the alternative reproducing file defined on a previously established area of the optical disc, when implementing the alternative reproducing file cannot be performed according to the determining result.

5. The optical recording-reproducing apparatus of claim 4, wherein the information related to the alternative reproducing file comprises a start address, end address or length information regarding the alternative reproducing file.

6. The optical recording-reproducing apparatus of claim 1, further comprising:
   a menu generator configured to generate a menu screen in order to form an interface with a user so that the target video data can be reproduced,
   wherein the menu generator operates when implementing an index file, which corresponds to reproducing-managing file, cannot be performed.

7. The optical recording-reproducing apparatus of claim 1, wherein the reproducer is further configured to determine the failure of reproducing the target video by using the reproducing-managing file in response to the reproducing-managing file not being loaded for a certain period of time, and wherein the reproducing-managing file corresponds to an index file or a title that represents a playlist of the optical disc.

8. An optical recording-reproducing method, comprising:
   determining whether driving an optical disc in which alternative reproducing files are stored can be performed;
   attempting to reproduce target video data recorded on the optical disc by executing a reproducing-managing file; and
   attempting to reproduce the target video from the optical disc by executing one of the alternative reproducing files that includes information to access the video data in response to a failure of reproducing the target video by using the reproducing-managing file.

9. The optical recording-reproducing method of claim 8, wherein the alternative reproducing files are registered in a file name on a file system including the reproducing-managing file.

10. The optical recording-reproducing method of claim 9, wherein the attempting to reproduce the target video by executing the one of the alternative reproducing files comprises:
   determining whether implementing the alternative reproducing files registered on the file system can be performed; and reading information related to the alternative reproducing files defined on a previously established area of the optical disc, searching the alternative reproducing files recorded on an arbitrary area of the optical disc, and reproducing the target video data when the alternative reproducing files recorded on an arbitrary area are searched.

11. The optical recording-reproducing method of claim 10, wherein the information related to the alternative reproducing files comprises a start address, end address or length information regarding the alternative reproducing files.

12. The optical recording-reproducing method of claim 8, further comprising:

generating and displaying a menu screen to form an interface with a user so that the target video data can be reproduced, wherein the generating and displaying the menu screen generates and displays the menu screen, when implementing an index file, which corresponds to the reproducing-managing file, cannot be performed.

13. A computer-readable recording medium configured to implement an optical recording-reproducing method, wherein the optical recording-reproducing method comprises:

determining whether driving an optical disc in which alternative reproducing files are stored can be performed;

attempting to reproduce target video data recorded on the optical disc by executing a reproducing-managing file; and attempting to reproduce the target video from the optical disc by executing one of the alternative reproducing files that includes information to access the target video data in response to a failure of reproducing the target video using the reproducing-managing file.

14. The optical recording-reproducing apparatus of claim 1, wherein the reproducing-managing file corresponds to a standard optical disc application which is loaded to reproduce the target video data and read an index of the optical disc, and the alternative reproducing file corresponds to an alternative method of accessing the target video data without executing the standard optical disc application.

* * * * *